United States Patent [19]

Hassell, Jr.

[11] Patent Number: 5,067,770
[45] Date of Patent: Nov. 26, 1991

[54] SUN SHIELD FOR A CHILDS CAR SEAT

[76] Inventor: Edwin Hassell, Jr., P.O. Box 850, Nesconset, N.Y. 11767

[21] Appl. No.: 633,462

[22] Filed: Dec. 24, 1990

[51] Int. Cl.$^5$ .................................................. A47C 7/62
[52] U.S. Cl. .................................... 297/184; 135/19.5; 160/20
[58] Field of Search ................. 297/184; 135/19.5, 89, 135/90; 160/19, 20, 22, 57, 58.1, 370.2

[56] References Cited

U.S. PATENT DOCUMENTS

| | | | |
|---|---|---|---|
| 3,279,845 | 10/1966 | Lutz | 160/370.2 X |
| 4,314,727 | 2/1982 | Potts | 297/184 |
| 4,784,433 | 11/1988 | Purnell-Ayres | 297/184 |
| 4,823,822 | 4/1989 | Maya | 135/19.5 |
| 4,923,249 | 5/1990 | Mattox | 257/184 |

Primary Examiner—Laurie K. Cranmer
Assistant Examiner—James M. Gardner
Attorney, Agent, or Firm—Michael I. Kroll

[57] ABSTRACT

A sun shield for a childs car seat is provided and consists of a single flat piece of pre-cut firm bendable material having a roof segment, a pair of side visor segments, a pair of support flap segments and a back segment, with a cut out gap area between each support flap segment and the back segment. A plurality of machine-made fold lines, each located between all the segments and adhesive for securing the support flap segments to the rear surface of the back segment when the bendable material is folded up along all the fold lines to form said sun shield. The back segment can be adjustably placed between the backrest of the car seat and a seat back of a rear seat of an automobile with the roof segment extending over the head of the child to protect the head from rays of the sun entering through the windows of the automobile and not obstruct the rear view mirror for the driver of the automobile.

8 Claims, 3 Drawing Sheets

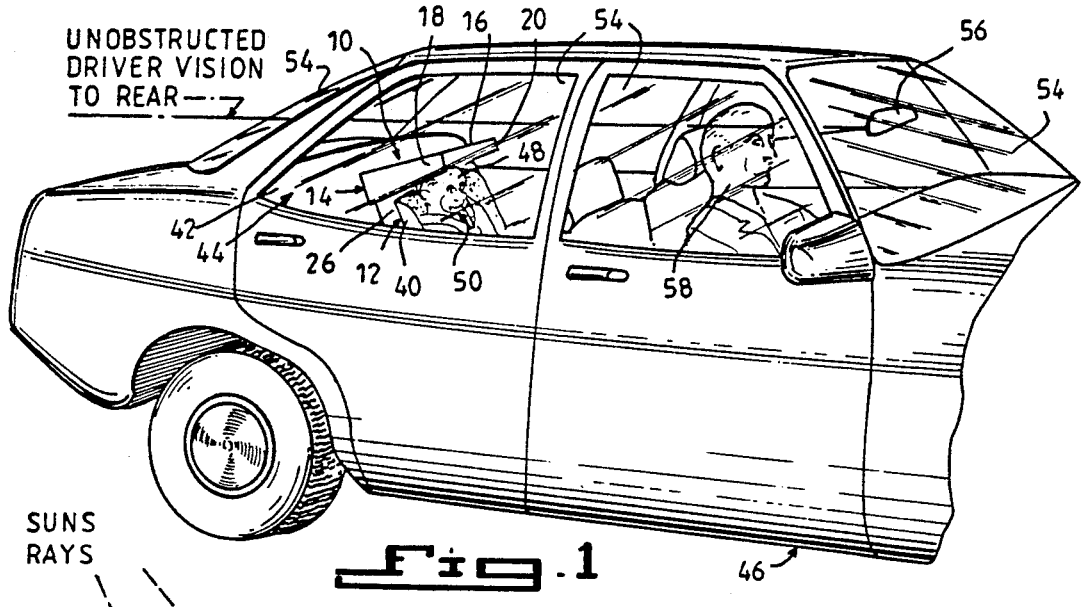
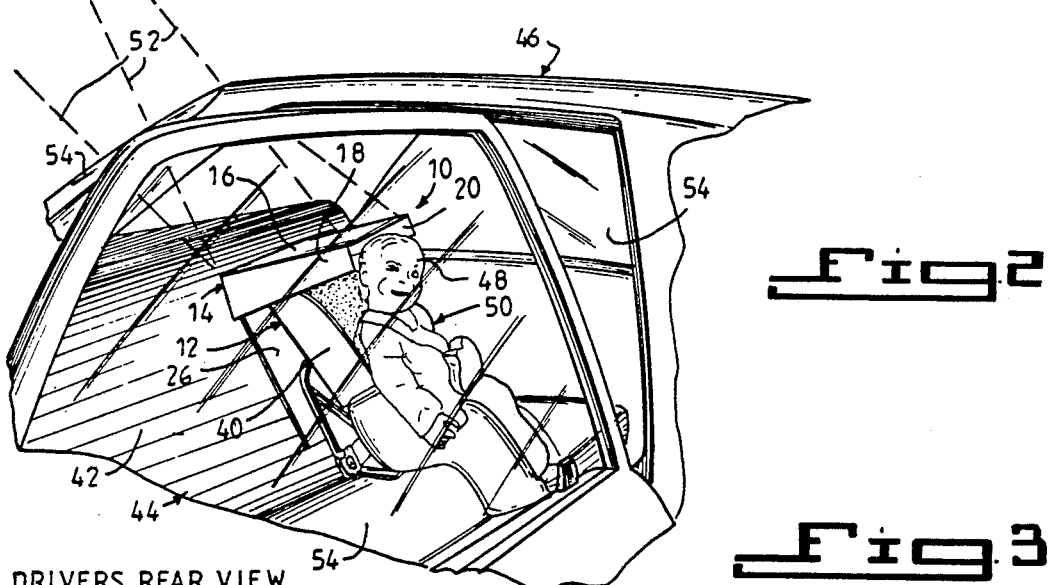
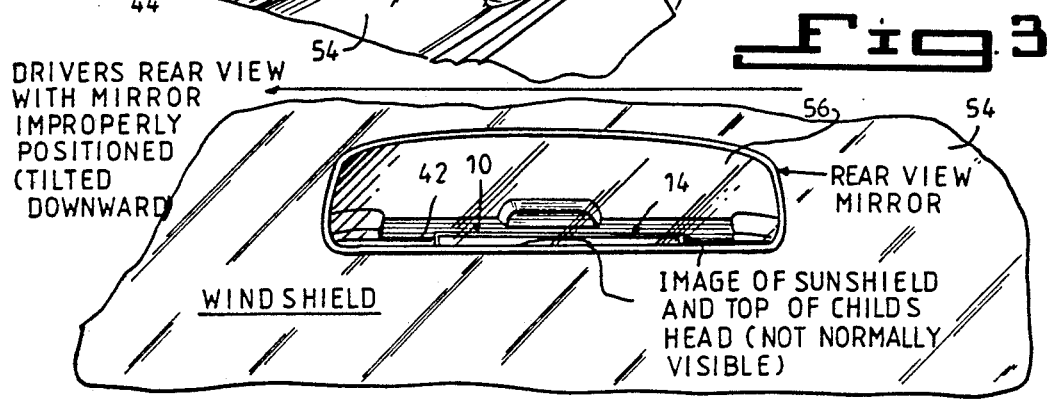

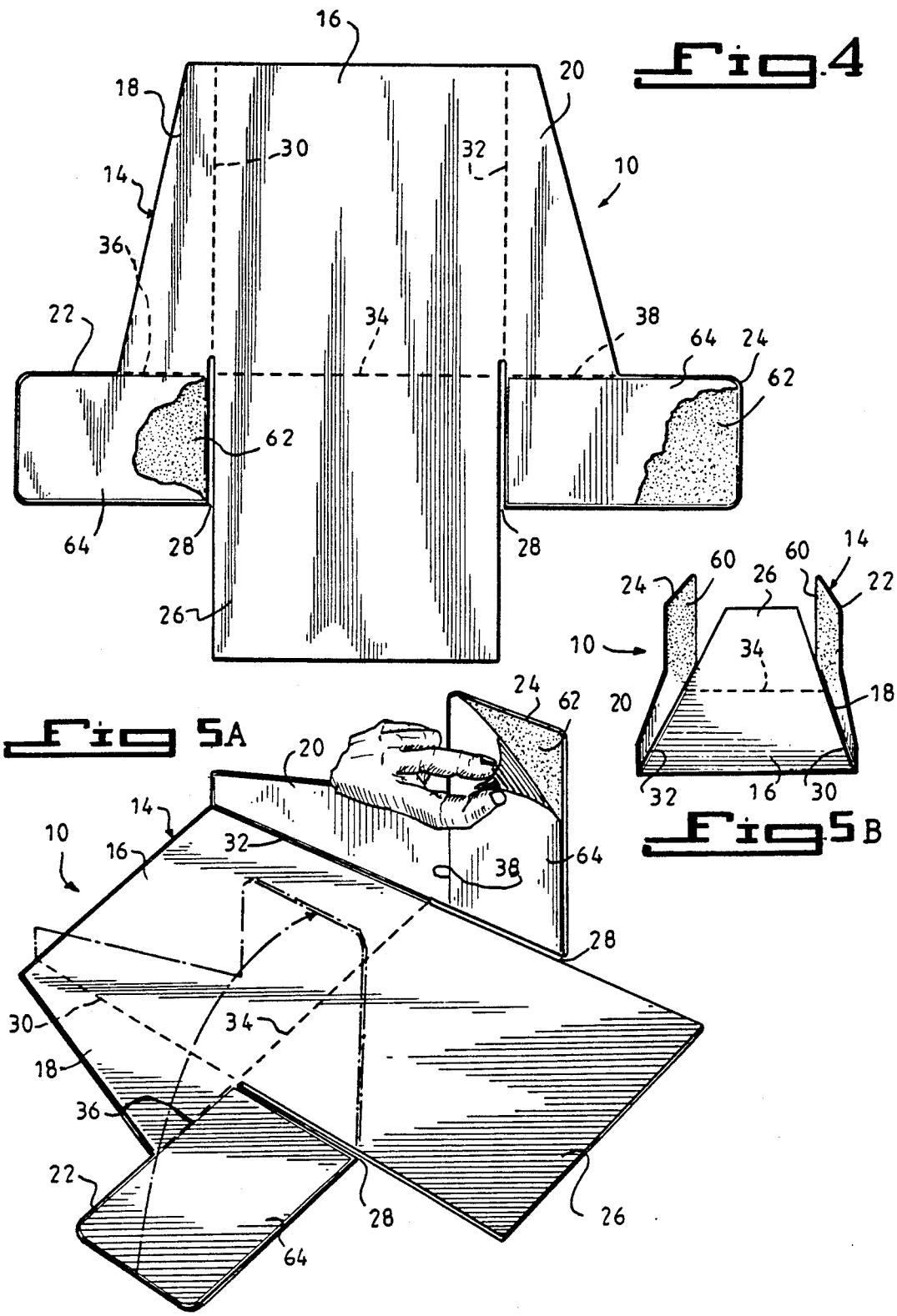

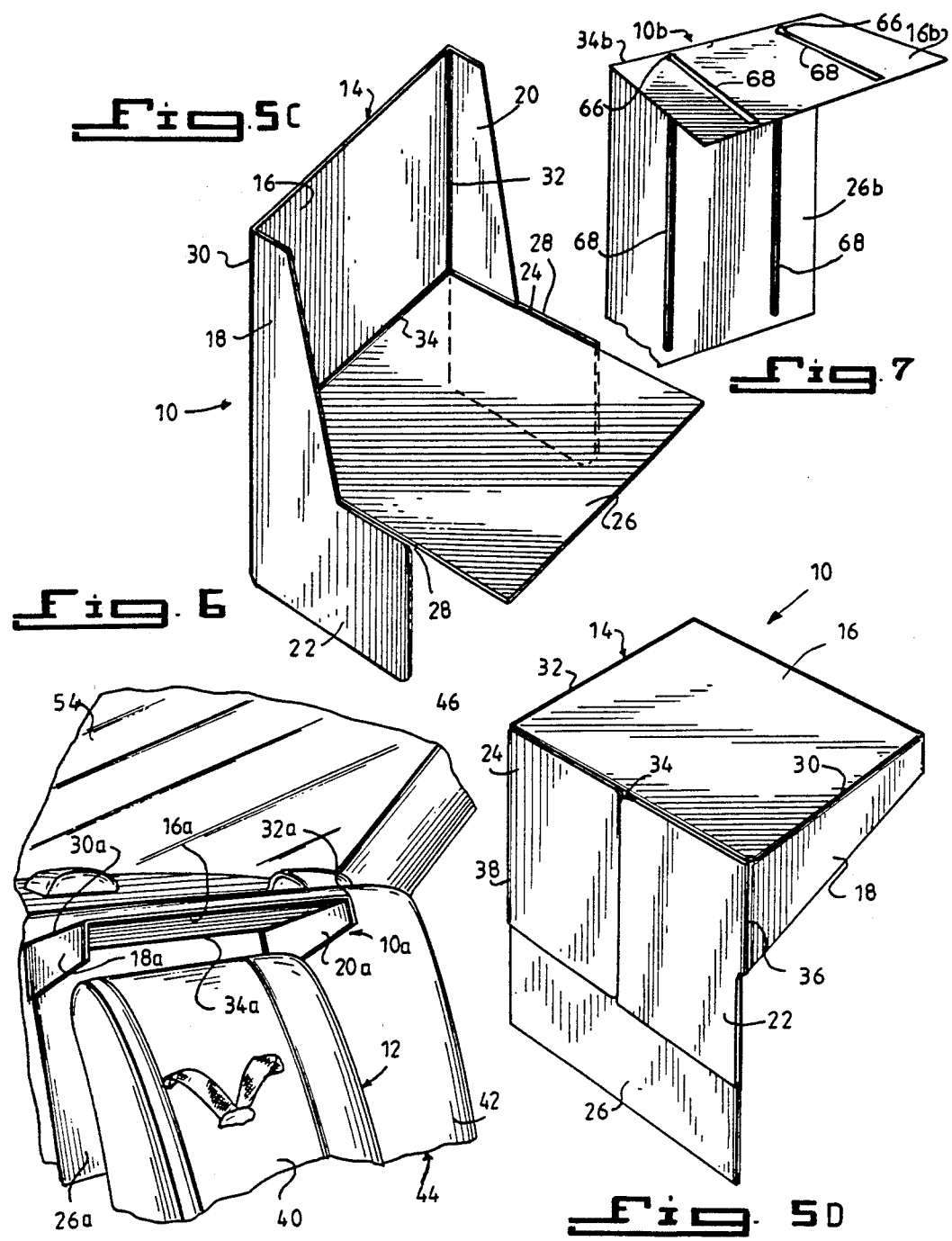

SUN SHIELD FOR A CHILDS CAR SEAT

BACKGROUND OF THE INVENTION

1. Field of the Invention

The instant invention relates generally to a childs car seats and more specifically it relates to a sun shield for a childs car seat.

2. Description of the Prior Art

Numerous childs car seats have been provided in prior art that are adapted to retain children in secured positions in the back seats of automobiles so as to reduce injury and death to the children riding in the automobiles when the automobile is in an accident. While these units may be suitable for the particular purpose to which they address, they would not be as suitable for the purposes of the present invention as heretofore described.

SUMMARY OF THE INVENTION

A primary object of the present invention is to provide an unattached sun shield for a childs car seat that will overcome the shortcomings of the prior art devices.

Another object is to provide an unattached sun shield for a childs car seat that can be used year round to protect a childs head from direct and harmful rays of the sun that enters through the windows of an automobile when the child is restrained in the car seat.

An additional object is to provide an unattached sun shield for a childs car seat that is height adjustable with respect to the car seat so that it will minimize any interference with a clear and full view of the roadway through the rear window by the driver. Importantly an unobstructed view depends upon a multiplicity of factors such as the height of the seat back in the automobile, the height of the child's car seat, the car seat's positioning on the rear seat of the automobile, the height of the child being restrained and the positioning of the sun shield by the car's driver.

Importantly repositioning the child's car seat will permit the sun shield to remain out of the line of view when the driver uses the rear view mirror.

A further object is to provide a sun shield for a childs car seat that is simple and easy to use.

A still further object is to provide a sun shield for a childs car seat that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention installed between a childs car seat and the seat back in the rear of an automobile being unobstructed to the rear vision of the driver.

FIG. 2 is an enlarged perspective view of a portion of the automobile with the rear door open showing how the sun shield protects the childs head from the rays of the sun.

FIG. 3 is an elevational view of the rear view mirror showing the top of the sun shield below the rear windshield.

FIG. 4 is an open flat plan view of the instant invention before assembly.

FIGS. 5A to 5D various perspective views showing the instant invention being folded and assembled for use.

FIG. 6 is a perspective view of a first modification of the instant invention between the backrest of the car seat and the seat back of the rear seat of the automobile.

FIG. 7 is a perspective view of a second modification of the instant invention.

DETAILED DESCRIPTION OF THE PREFERRED EMBODIMENTS

Turning now descriptively to the drawings, in which similar reference characters denote similar elements throughout the several views, FIGS. 1 through 5D illustrate a sun shield 10 for a childs car seat 12 consisting of a single flat piece of pre-cut firm bendable material 14 having a roof segment 16, a pair of side visor segments 18, 20 a pair of support flap segments 22, 24 and a back segment 26, with a cut out gap area 28 between each support flap segment 22, 24 and the back segment 26.

A first machine-made fold line 30 is between the roof segment 16 and the first side visor segment 18, a second machine-made fold line 32 is between the roof segment 16 and the second side visor segment 20, a third machine-made fold line 34 is between the roof segment 16 and the back segment 26, a fourth machine-made fold line 36 is between the first side visor segment 18 and the first support flap segment 22, while a fifth machine-made fold line 38 is between the second side visor segment 20 and the second support flap segment 24. The support flap segments 22 and 24 are secured to the rear surface of the back segment 26 when the bendable material 14 is folded up along all the fold lines to form the sun shield 10. The back segment 26 can be adjustably placed between the backrest 40 of the child's car seat 12 and a seat back 42 of a rear seat 44 of an automobile 46. The roof segment 16 extends over the head 48 of the child 50 to protect the head 48 from rays 52 of the sun entering through the windows 54 of the automobile 46 and not obstruct the rear view mirror 56 for the driver 58 of the automobile 46.

The piece of pre-cut firm bendable material 14 is a standard gauge corrugated cardboard material. As shown in FIG. 5B, quick set glue 60, like that used on envelopes is applied onto each support flap segment 22 and 24 for securing them to the back segment 26. As shown in FIGS. 4 and 5A, adhesive 62 is applied onto each support flap segment 22 and 24. A peel-off cover sheet 64 is applied over the adhesive 62 on each support flap segment 22 and 24 for securing them to the back segment 26.

The sole purpose of the sun shield 10 is to keep the direct and harmful rays 52 of the sun that enter through the rear window 54 of automobile 46 off a child's head 48 when he or she is restrained in a child's car seat 12. The sun shield will also help keep the sun's rays off a child's head 48 when the child 50 is situated in its car seat 12 alongside a side window 54 of the automobile 46. It also helps keep the car seat 12 shielded from direct sunlight when the automobile 46 is parked out in the hot sun.

The invention is to be used year round to protect a restrained child's head 48 from the direct rays 52 of the sun while seated in a car seat 12. It is height adjustable to accommodate different size children and to minimize interference of a clear and full view of the road and condition of traffic behind the automobile 46 through the rear window 54. The sun shield 10 is paced between the back of a child's car seat 12 and the seat back 42 in the automobile 46, and is held in place by the weight of the child 50 and the car seat 12 against it.

The side visor segments 18 and 20 serve as support bracing for the roof segment 16 and help prevent the sun shield 10 from blowing upward when the windows 54 are open and outside air rushes into the automobile 46. They also assist somewhat in blocking direct sunlight from the child 50. The back segment 26 of the sun shield 10 is an extension of the roof segment 16 and gives it support. The back segment 26 rests against the seat back 42 of the automobile 46. The back segment 26 is also joined to the two side visor segments 18 and 20 by two support flap segments 22 and 24 that extend from the rear portion of each side visor segment and are affixed with either self-sticking adhesive 62 or quick set glue 60. They help hold the roof segment 16 securely to the back segment 26 and also provide stability for the roof segment against wind and accidental jarring. Support of the sun shield's roof segment 16 is three-fold; by the side visor segments 18 and 20, by the two support flap segments 22 and 24 and by the back segment 26.

The top of the roof segment 16 and the side visor segments 18 and 20 should be dull white to help deflect the sun's rays 52 and its heat without glare. The remainder can be any of a variety of other colors, but one uniform color is recommended for maintaining low manufacturing cost. Final assembly is done by the purchaser, by hand, and without tools or other materials. An instruction sheet is enclosed and assembly is easy to perform. Because the sun shield 10 is made from standard gauge packaging cardboard, it is easy and very inexpensive to manufacture, inexpensive for consumers to purchase, and simple to assemble by the purchaser. Assembly time is about three minutes.

ASSEMBLY INSTRUCTIONS FOR THE SUN SHIELD 10

1. Fold the cardboard 14 along its fold lines 30 to 38 to approximate its configuration will fully assembled.
2. Remove one peel-off cover sheet 64 from a support flap segment 22 which will expose its adhesive 62.
3. Then fold the support flap segment 22 behind the back segment 26 and apply pressure so that the support flap segment 22 adheres to the rear surface of the back segment 26 and they are joined together.
4. Repeat the above procedure with the remaining support flap segment 24 by removing the adhesive's peel-off cover sheet 64 and folding the support flap segment 24 behind the back segment 26 and exert pressure.

A modified sun shield 10a for the child's car seat 12 is shown in FIG. 6 and consists of a roof member 16a to extend over the head 48 of a child 50 retained in the car seat 12. A pair of side visors 18a and 20a, each extend downwardly from one side edge 30a and 32a of the roof member 16a. A back piece 26a extends downwardly from the rear edge 34a of the roof member 16a which is placed between the backrest 40 of the car seat 12 and the seat back 42 of the rear seat 44 of the automobile 46. The sun shield 10a can be height adjustable over the head 48 of the child 50 to protect the head 48 from the rays 52 of the sun 48 entering through the windows 54 of the automobile 46 and not obstruct the rear view mirror 56 for the driver 58 of the automobile 46. The sun shield 10a is manufactured out of a single unit piece of an opaque plastic material.

A second modified sun shield 10b for the childs car seat 12 is shown in FIG. 7 and consists of a roof member 16b to extend over the hear 48 of the child 50 retained in the car seat 12. The roof member 16b has a pair of spaced apart holes 66 proximate its rear edge 34b thereof. A back piece 26b extends downwardly from the rear edge 34b of the roof member 16b. A pair of bent support members 68 are also provided. Each is vertically positioned to extend through one hole 66 and affixed, such as by glue and/or tape to the top of the roof member 16b and the front of the back piece 26b. The back piece 26b is placed between the back rest 40 of the car seat 12 and the seat back 42 of the rear seat 44 of the automobile 46. This enables the sun shield 10b to be height adjustable over the head 48 of the child 50 to protect the head 48 from the rays 52 of the sun 48 entering through the windows 54 of the automobile 46 and not obstruct the rear view mirror 56 for the driver 58 of the automobile 46. The second modified sun shield 10b is manufactured out of a single bent unit piece of standand guage corrugated cardboard material. Each support member 68 is a piece of wire or a plastic rod.

LIST OF REFERENCE NUMBERS 10 sun shield
10a modified sun shield
10b second modified sun shield
12 childs car seat
14 single flat piece of pre-cut firm bendable material
16 roof segment of 10
16a roof member of 10a
16b roof member of 10b
18 first side visor segment of 10
18a first side visor of 10a
20 second side visor segment of 10
20a second side visor of 10a
22 first support flap segment of 10
24 second support flap segment of 10
26 back segment of 10
26a back piece of 10a
28 cut out gap area
30 first machine-made fold line
30a first side edge of 16a
32 second machine-made fold line
32a second side edge of 16a
34 third machine-made fold line
34a rear edge of 16a
34b rear edge of 16b
36 fourth machine-made fold line
38 fifth machine-made fold line
40 backrest of 12
42 seat back
44 rear seat
46 automobile
48 head
50 child
52 rays of the sun
54 window
56 rear view mirror
58 driver
60 quick seat glue
62 adhesive 64 peel-off cover sheet
66 hole in 16b
68 bent support member It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and i its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A sun shield for a childs car seat comprising:
   a) a single flat piece of pre-cut firm bendable material having a roof segment, a pair of side visor segments, a pair of support flap segments and a back segment, with a cut out gap area between each said support flap segment and said back segment;
   b) a first machine-made fold line between said roof segment and said first side visor segment;
   c) a second machine-made fold line between said roof segment and said second side visor segment;
   d) a third machine-made fold line between said roof segment and said back segment;
   e) a fourth machine-made fold line between said first side visor segment and said first support flap segment;
   f) a fifth machine-made fold line between said second side visor segment and said second support flap segment; and
   g) means for securing said support flap segments to the rear surface of said back segment when said bendable material is folded up along all said fold lines to form said sun shield so that said back segment can be adjustably placed between the backrest of the car seat and a seat back of a rear seat of an automobile with said roof segment extending over the head of the child to protect the head from rays of the sun entering through the windows of the automobile and not obstruct the rear view mirror for the driver of the automobile.

2. A sun shield as recited in claim 1, wherein said piece of pre-cut firm bendable material is a standard gauge corrugated cardboard material.

3. A sun shield as recited in claim 2, wherein said securing means is quick set glue, like that used on envelopes applied onto each said support flap segment.

4. A sun shield as recited in claim 2, wherein said securing means include:
   a) adhesive applied onto each said support flap segment; and
   b) a pair of peel-off cover sheets, each applied over said adhesive on each said support flap segment.

5. A sun shield for a childs car seat comprising:
   a) a roof member to extend over the head of a child retained in the car seat, said roof member having a pair of spaced apart holes proximate to its rear edge thereof;
   b) a back piece extending downwardly from the rear edge of said roof member; and
   c) a pair of bent support members, each vertically positioned extending through one hole and affixed to the top of said roof member and the front of said back piece, in which said back piece is placed between the backrest of the car seat and seat back of a rear seat of an automobile enabling said sun shield to be height adjustable over the head of the child to protect the head from the rays of the sun entering through the windows of the automobile and not obstruct the rear view mirror for the driver of the automobile.

6. A sun shield as recited in claim 5, wherein said sun shield is manufactured out of a single bent unit piece of standard guage corrugated cardboard material.

7. A sun shield as recited in claim 6, wherein each said support member is a piece of wire.

8. A sun shield as recited in claim 6, wherein each said support member is a plastic rod.

* * * * *